(12) United States Patent
Chung et al.

(10) Patent No.: US 10,818,922 B2
(45) Date of Patent: Oct. 27, 2020

(54) ANODE ACTIVE MATERIAL, A SODIUM ION SECONDARY BATTERY INCLUDING AN ANODE ACTIVE MATERIAL, AND AN ELECTRIC DEVICE INCLUDING THE SECONDARY BATTERY

(71) Applicant: KOREA INSTITUTE OF SCIENCE AND TECHNOLOGY, Seoul (KR)

(72) Inventors: Kyung Yoon Chung, Seoul (KR); Hun-Gi Jung, Seoul (KR); Ji-Young Kim, Seoul (KR); Ghulam Ali, Seoul (KR); Mobinul Islam, Seoul (KR); Sang Ok Kim, Seoul (KR); Hyungseok Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 84 days.

(21) Appl. No.: 16/268,891

(22) Filed: Feb. 6, 2019

(65) Prior Publication Data

US 2019/0319265 A1 Oct. 17, 2019

(30) Foreign Application Priority Data

Apr. 11, 2018 (KR) ........................ 10-2018-0042222

(51) Int. Cl.
*H01M 4/525* (2010.01)
*H01M 10/054* (2010.01)
(Continued)

(52) U.S. Cl.
CPC ............ *H01M 4/525* (2013.01); *C01G 51/04* (2013.01); *H01M 4/131* (2013.01);
(Continued)

(58) Field of Classification Search
CPC .................................................... H01M 4/525
See application file for complete search history.

(56) References Cited

FOREIGN PATENT DOCUMENTS

| JP | 2015-198055 A | 11/2015 |
|---|---|---|
| KR | 10-2014-0103376 A | 8/2014 |
| KR | 10-2017-0004105 A | 1/2017 |

OTHER PUBLICATIONS

G. Wang et al., "Hydrothermal synthesis of $Co_2SnO_4$ nanocrystals as anode materials for Li-ion batteries", Journal of Power Sources, 2009, pp. 719-723, vol. 192.

(Continued)

*Primary Examiner* — William D Young
(74) *Attorney, Agent, or Firm* — Rabin & Berdo, P.C.

(57) ABSTRACT

An anode active material for a sodium ion secondary battery, a sodium ion secondary battery including an anode active material, and an electric device including the sodium ion secondary battery are disclosed. The anode active material for a sodium ion secondary battery includes a cobalt tin spinel oxide represented by $Co_{2.4}Sn_{0.6}O_4$. The sodium ion secondary battery includes an anode made of an anode active material composed of a cobalt tin spinel oxide represented by Chemical Formula 1 below:

$$Co_{2+x}Sn_{1-x}O_4, \quad \text{Chemical Formula 1}$$

where x is a real number satisfying $0 \leq x \leq 0.9$;
an electrolyte; and a cathode. The sodium ion secondary battery has high capacity characteristics. The electric device including the sodium ion secondary battery includes an electric vehicle, a hybrid electric vehicle, a plug-in hybrid electric vehicle, and an electric power storage system.

8 Claims, 19 Drawing Sheets

(51) Int. Cl.
  *H01M 4/131*   (2010.01)
  *H01M 4/1391*  (2010.01)
  *C01G 51/04*   (2006.01)
  *H01M 4/02*    (2006.01)

(52) U.S. Cl.
  CPC ....... *H01M 4/1391* (2013.01); *H01M 10/054* (2013.01); *C01P 2002/32* (2013.01); *C01P 2002/72* (2013.01); *C01P 2002/85* (2013.01); *C01P 2004/64* (2013.01); *H01M 2004/021* (2013.01)

(56) References Cited

OTHER PUBLICATIONS

Paul A. et al., "Combined X-ray study of lithium (tin) cobalt oxide matrix negative electrodes for Li-ion batteries", Electrochimica Acta, 2002, pp. 2885-2892, vol. 47.

S. Thota et al., "On the nature of magnetic state in the spinel $Co_2SnO_4$", J. Phys.: Condens. Matter, 2015, pp. 1-8, vol. 166001.

Lituo Zheng et al., "Honeycomb Compound $Na_3Ni_2BiO_6$ as Positive Electrode Material in Na Cells", Journal of the Electrochemical Society, 2016, pp. A2362-A2367, vol. 163, No. 10.

ANODE ACTIVE MATERIAL, A SODIUM ION SECONDARY BATTERY INCLUDING AN ANODE ACTIVE MATERIAL, AND AN ELECTRIC DEVICE INCLUDING THE SECONDARY BATTERY

CROSS-REFERENCE TO RELATED APPLICATIONS

This application claims, under 35 U.S.C. § 119, the priority of Korean Patent Application No. 10-2018-0042222 filed on Apr. 11, 2018 in the Korean Intellectual Property Office, the disclosure of which is incorporated herein by reference in its entirety.

TECHNICAL FIELD

The present disclosure relates to an anode active material for a sodium ion secondary battery, a method for preparing the same, and a sodium ion secondary battery including the same. More particularly, the present disclosure relates to an anode active material for a sodium ion secondary battery including a cobalt tin spinel oxide obtained by a simple precipitation process, and to application of the anode active material to a sodium ion secondary battery having high capacity characteristics.

BACKGROUND

In the case of a high-performance lithium ion secondary battery (LIB), many studies have been conducted currently to improve the performance thereof. However, since the deposits of lithium are insufficient and thus lithium is expensive, there is a limitation in application of the lithium secondary battery to a large-capacity energy storage system. To overcome such a limitation, a sodium ion secondary battery (SIB) using sodium has been given many attentions, since the deposits of sodium are rich and thus sodium is cheap.

The sodium ion secondary battery shows relatively lower energy density and output density as compared to the lithium ion secondary battery due to a difference in physical properties, such as a difference between the size of lithium ion and that of sodium ion. However, weight or volume is not important in the case of a large-capacity energy storage system. Thus, sodium ion can be a good substitute for lithium ion by virtue of low cost and rich deposits. In addition, sodium is positioned right below lithium in the Periodic Table. Therefore, the two elements are similar in terms of chemistry, and thus sodium ion suitably substitutes for lithium ion.

As mentioned earlier, many studies have been conducted about a cathode active material having a layered structure by virtue of the advantages of the sodium ion secondary battery. However, development of an anode is relatively unfinished.

According to the related art, an anode material, such as graphite or silicon, which has been studied widely in the field of a lithium secondary battery, is not amenable to sodium ion intercalation. In addition, since the existing layered anode material has a limitation in charging/discharging due to a large size (1.03 Å) of sodium ion, and thus is reported to provide low capacity. To overcome such a limitation, some studies have been conducted about the use of a metal oxide as an anode material for a sodium ion secondary battery. It is known that such a metal oxide shows high capacity characteristics.

Therefore, the present inventors have found that an anode active material for a sodium ion secondary battery including a cobalt tin spinel oxide obtained by a simple precipitation process can be applied to a sodium ion secondary battery having high capacity characteristics. The present disclosure is based on this finding.

REFERENCES

Patent Document 1. Korean Patent Laid-Open No. 10-2014-0103376
Patent Document 2. Korean Patent Laid-Open No. 10-2017-0004105

SUMMARY

The present disclosure is designed to solve the problems of the related art, and an embodiment of the present disclosure is directed to providing an anode active material for a sodium ion secondary battery including a cobalt tin spinel oxide obtained by a simple precipitation process, and application of the anode active material to a sodium ion secondary battery having high capacity characteristics.

In one aspect of the present disclosure, there is provided an anode active material for a sodium ion secondary battery including a cobalt tin spinel oxide represented by the following Chemical Formula 1:

$$Co_{2+x}Sn_{1-x}O_4 \qquad \text{[Chemical Formula 1]}$$

wherein x is a real number satisfying $0 \leq x \leq 0.9$.

In another aspect of the present disclosure, there is provided a sodium ion secondary battery including: an anode including the anode active material according to the present disclosure; an electrolyte; and a cathode.

In still another aspect of the present disclosure, there is provided an electric device including the anode active material for a sodium ion secondary battery according to the present disclosure, the electric device being at least one selected from electric vehicles, hybrid electric vehicles, plug-in hybrid electric vehicles and electric power storage systems.

In yet another aspect of the present disclosure, there is provided a method for preparing an anode active material for a sodium ion secondary battery including a cobalt tin spinel oxide represented by the following Chemical Formula 1, the method including the steps of: (a) adding a precipitating agent to a precursor solution containing a cobalt precursor and a tin precursor to form a precipitate; and (b) filtering, drying and heat treating the precipitate:

$$Co_{2+x}Sn_{1-x}O_4 \qquad \text{[Chemical Formula 1]}$$

wherein x is a real number satisfying $0 \leq x \leq 0.9$.

According to the present disclosure, it is possible to obtain an anode active material for a sodium ion secondary battery including a cobalt tin spinel oxide obtained by a simple precipitation process. It is also possible to apply the anode active material to a sodium ion secondary battery having high capacity characteristics.

BRIEF DESCRIPTION OF THE DRAWINGS

[FIG. 2A: scale bar: 1 μm, FIG. 2B: scale bar: 100 nm and FIG. 2C: scale bar: 5 nm].

[FIG. 3A: XPS graph in a range of 0 to 1300 eV, FIG. 3B: Co 2p, FIG. 3C: Sn 3d, and FIG. 3D: O 1s].

FIGS. 5A to 5D show the results of X-ray absorption spectrometry (XAS) of $Co_{2.4}Sn_{0.6}O_4$ according to Example 1, wherein FIG. 5A is a graph illustrating the samples for XAS analysis in charge/discharge behaviors, FIG. 5B illustrates the X-ray absorption near edge structure (XANES) analysis results of the anode including $Co_{2.4}Sn_{0.6}O_4$ at Co K-edge, FIG. 5C illustrates the extended X-ray absorption fine structure (EXAFS) analysis results of the anode including $Co_{2.4}Sn_{0.6}O_4$ at Co K-edge, and FIG. 5D illustrates the XANES results of the anode including $Co_{2.4}Sn_{0.6}O_4$ at Sn K-edge.

DETAILED DESCRIPTION OF EMBODIMENTS

Figure 1:
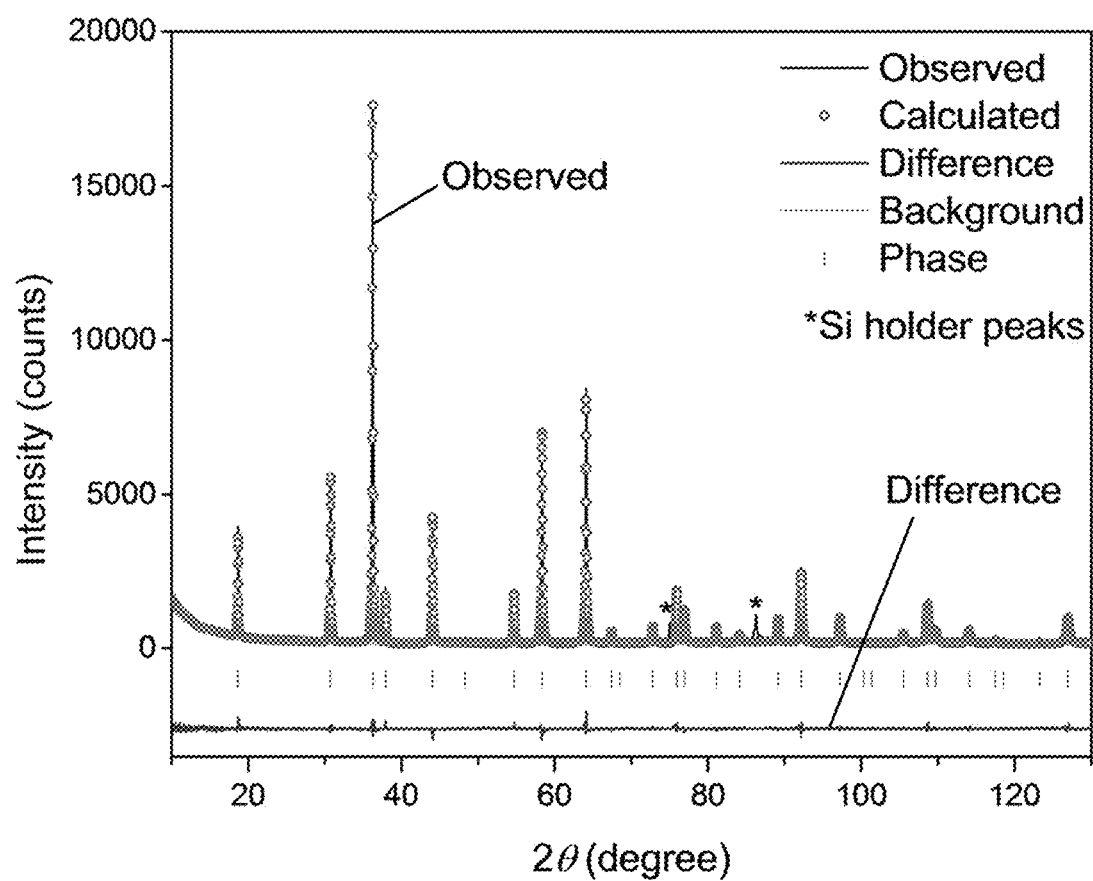
FIG. 1 is a graph illustrating the X-ray diffraction (XRD) characteristics of $Co_{2.4}Sn_{0.6}O_4$ according to Example 1.

Hereinafter, various aspects and embodiments of the present disclosure will be explained in more detail.

In one aspect, there is provided an anode active material for a sodium ion secondary battery including a cobalt tin spinel oxide represented by the following Chemical Formula 1:

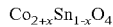  [Chemical Formula 1]

wherein x is a real number satisfying 0≤x≤0.9.

According to the related art, an anode material, such as graphite or silicon, which has been studied widely in the field of a lithium secondary battery, is not amenable to sodium ion intercalation. In addition, the existing layered anode material has a limitation in charging/discharging due to a large size (1.03 Å) of sodium ion, and thus is reported to provide low capacity.

To solve the limitation, the present inventors have found that an anode active material for a sodium ion secondary battery including a cobalt tin spinel oxide obtained by a simple precipitation process can be applied to a sodium ion secondary battery having high capacity characteristics. The present disclosure is based on this finding.

According to an embodiment, the anode active material for a sodium ion secondary battery may be $Co_{2.4}Sn_{0.6}O_4$.

Particularly, when $Co_{2.4}Sn_{0.6}O_4$ is used as an anode active material for a sodium ion secondary battery, the anode active material causes no agglomeration even at a high temperature of 800° C. or higher, thereby providing excellent thermal stability. On the contrary, in any cases using anode active materials other than the above-defined anode active material, agglomeration of anode active materials occurs significantly at a high temperature of 800° C. or higher.

According to another embodiment, the cobalt tin spinel oxide belongs to the space group Fd-3m; has a lattice constant a of 8.08985-8.08995, preferably 8.08988~8.08992 Å; and a volume of 529.450-529.460, preferably 529.452-529.457 Å$^3$.

Particularly, when the cobalt tin spinel oxide is within the above-defined ranges, the sodium ion diffusion rate is improved significantly. On the contrary, when the cobalt tin spinel oxide is not within the above-defined ranges, i.e., when it belongs to a different space group, or when it is not within the above-defined range of lattice constant or volume, the sodium ion diffusion rate is degraded significantly.

According to still another embodiment, the cobalt tin spinel oxide includes nanoparticles having a size of 5-100 nm, preferably 10-80 nm, and more preferably 20-60 nm and may be a 1-dimensional rod-type one having a length of 1-10 μm, preferably 2-8 μm, and more preferably 2.5-5 μm, and a thickness of 50-200 nm, preferably 60-180 nm, and more preferably 70-150 nm.

According to still another embodiment, after carrying out XPS analysis of the cobalt tin spinel oxide, the first XPS effective peak, the second XPS effective peak, the third XPS effective peak, the fourth XPS effective peak and the fifth XPS effective peak may appear at a binding energy range of 777-781 eV, 778-784 eV, 484-489 eV, 528-531 eV and 528-535 eV, respectively. Thus, it can be seen that the Co oxidation number is 2+ (778-784 eV) and 3+ (777-781 eV) suggesting a spinel structure, and the Sn oxidation number is 4+ (484-489 eV).

Particularly, although there is no clear description in the following Examples and Comparative Examples, after the anode active materials for a sodium ion secondary battery including a cobalt tin spinel oxide according to the present disclosure, wherein the composition of cobalt tin spinel oxide and XPS analysis results were varied, were applied to an anode of a sodium ion secondary battery and each battery was operated at high temperature for 500 hours, the section of the anode and the loss of the anode active material applied to the anode were determined through scanning electron microscopy (SEM).

As a result, unlike the other conditions and the other numerical ranges, when all of the following conditions were satisfied, no vacant space was generated at the interface between the anode and the anode active material, even after the battery was operated at high temperature for 500 hours. In addition, no loss of the anode active material applied to the anode was observed:

(1) The cobalt tin spinel oxide belongs to the space group Fd-3m; (2) the cobalt tin spinel oxide has a lattice constant a of 8.08985-8.08995; (3) the cobalt tin spinel oxide has a volume of 529.450-529.460 Å$^3$; (4) the cobalt tin spinel oxide includes nanoparticles having a size of 5-100 nm and is a 1-dimensional rod-type one having a length of 1-10 μm and a thickness of 50-200 nm; (5) after carrying out XPS analysis of the cobalt tin spinel oxide, the cobalt tin spinel oxide shows the first XPS effective peak, the second XPS effective peak, the third XPS effective peak, the fourth XPS effective peak and the fifth XPS effective peak appear at a binding energy range of 777-781 eV, 778-784 eV, 484-489 eV, 528-531 eV and 528-535 eV, respectively.

On the contrary, when any one of the above-mentioned conditions was not satisfied, vacant spaces were formed significantly at the interface between the anode and the anode active material, after the battery was operated at high temperature for 500 hours. In addition, a significant loss of the anode active material applied to the anode was observed.

In another aspect of the present disclosure, there is provided a sodium ion secondary battery including: an anode including the anode active material according to the present disclosure; an electrolyte; and a cathode.

According to an embodiment, the cathode may include $Na_3Ni_2BiO_6$.

Particularly, it is shown that when the cathode is $Na_3Ni_2BiO_6$, significantly higher coulombic efficiency is observed as compared to any type of cathode other than $Na_3Ni_2BiO_6$.

In still another aspect of the present disclosure, there is provided an electric device including the anode active material for a sodium ion secondary battery according to the present disclosure, the electric device being at least one selected from electric vehicles, hybrid electric vehicles, plug-in hybrid electric vehicles and electric power storage systems.

In yet another aspect of the present disclosure, there is provided a method for preparing an anode active material for a sodium ion secondary battery including a cobalt tin spinel oxide represented by the following Chemical Formula 1, the method including the steps of: (a) adding a precipitating agent to a precursor solution containing a cobalt precursor and a tin precursor to form a precipitate; and (b) filtering, drying and heat treating the precipitate:

$$Co_{2+x}Sn_{1-x}O_4 \quad \text{[Chemical Formula 1]}$$

wherein x is a real number satisfying 0≤x≤0.9.

The drying may be carried out at 30-100° C., preferably 40-90° C., and more preferably 50-70° C., for 1-24 hours, preferably 8-16 hours, and more preferably 10-14 hours.

According to an embodiment, the precipitating agent may be at least one selected from oxalate, carbonate of sodium or potassium, hydrogen carbonate, hydroxide, ammonium carbonate, ammonium hydrogen carbonate, ammonium hydroxide, ammonia and aqueous ammonia.

According to another embodiment, the heat treatment may be carried out by heating the precipitate to 500-700° C., preferably 550-650° C., and more preferably 580-620° C., at a heating rate of 1-10° C./min, preferably 3-7° C./min, and more preferably 4-6° C./min, and then maintaining the temperature for 1-10 hours, preferably 3-7 hours, and more preferably 4-6 hours.

When the heat treating condition is not within the range of 1-10° C./min and 500-700° C., it is difficult to obtain a spinel-type cobalt tin oxide.

The examples and experiments will now be described hereinafter with reference to the accompanying drawings.

Example 1: Preparation of $Co_{2.4}Sn_{0.6}O_4$

At room temperature, 72 mL of aqueous solution of 0.1M $CoSO_4.7H_2O$ (sigma aldrich), 18 mL of aqueous solution of 0.1M anhydrous $SnCl_2$ (Junsei chemical), 3 mL of saturated HCl solution and 90 mL of ethanol were mixed for 30 minutes. Then, while agitation was carried out continuously, 92 mL of aqueous solution of 0.1M $Na_2C_2O_4$ (sigma aldrich) was promptly to the solution, and agitation and reaction were carried out to form a pink precipitate. The resultant precipitate was washed with distilled water and ethanol and the precipitate was isolated by using a centrifugal separator. The isolated precipitate was dried at 60° C. for 12 hours and heated to 600° C. in the air at a heating rate of 5° C./min. Then, the temperature was maintained for 5 hours to carry out heat treatment, thereby providing $Co_{2.4}Sn_{0.6}O_4$.

Example 2: Manufacture of Coin Type Half-cell

First, $Co_{2.4}Sn_{0.6}O_4$ obtained from Example 1 was mixed with carbon super, KS6 and polyacrylic acid (35 wt % in $H_2O$) at a weight ratio of 6:1:1:2 in ethanol, and the resultant mixture was applied to Cu foil to obtain an electrode. The electrode obtained by using a rolling press had a thickness of 28 μm. The electrode was dried in an oven at 80° C. for 4 hours before carrying out an electrochemical test.

Next, the obtained $Co_{2.4}Sn_{0.6}O_4$ working electrode, a Na counter electrode, a glass separator and an electrolyte including 1M $NaClO_4$ dissolved in polyethylene carbonate (PC) organic solvent containing 2 wt % of fluoroethylene carbonate (FEC) dissolved therein were used to assemble a coin type half-cell (CR2032). The half-cell was manufactured in a glove box filled with argon gas containing 0.1 ppm or less of $H_2O$ and $O_2$.

Example 3: Manufacture of Coin Type Full Cell $Na_3Ni_2BiO_6$ as an electrode active material, carbon black, polyvinylidene fluoride (PVdF) (weight ratio 7:2:1) were mixed in N-methyl pyrrolidone (NMP) to obtain electrode slurry. The electrode slurry was cast onto Al foil and dried, and then 1M $NaPF_6$ dissolved in a mixed organic solvent containing ethylene carbonate (EC) and diethyl carbonate (DEC) (volume ration 1:1) was used as an electrolyte and injected to the cell, thereby providing a $Na_3Ni_2BiO_6$ cathode. Then, $Co_{2.4}Sn_{0.6}O_4$ according to Example 1 was used as an anode to obtain a full cell. The full cell was manufactured in a glove box filled with argon gas containing 0.1 ppm or less of $H_2O$ and $O_2$.

FIG. 1 is a graph illustrating the X-ray diffraction (XRD) characteristics of $Co_{2.4}Sn_{0.6}O_4$ according to Example 1.

Referring to FIG. 1, it can be seen that the spinel structure is retained even after Sn is doped to spinel $Co_3O_4$.

Figure 2A:
FIGS. 2A to 2C show images illustrating the analysis results of transmission electron microscopy (TEM) of $Co_{2.4}Sn_{0.6}O_4$ according to Example 1.
Figure 2B:
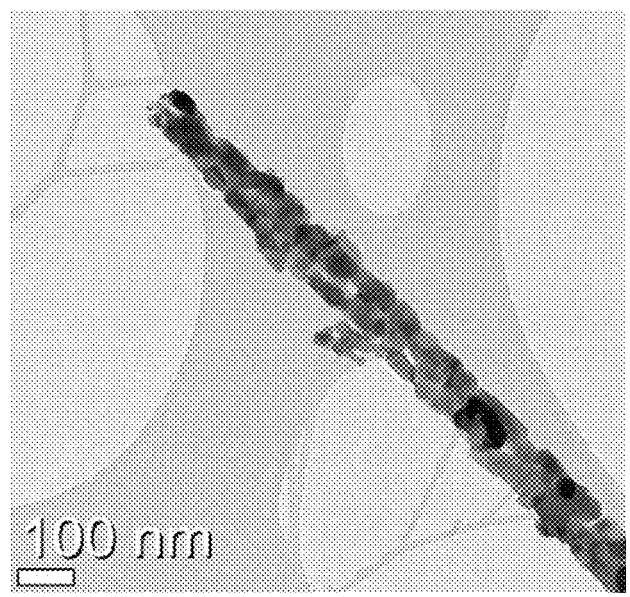
Figure 2C:
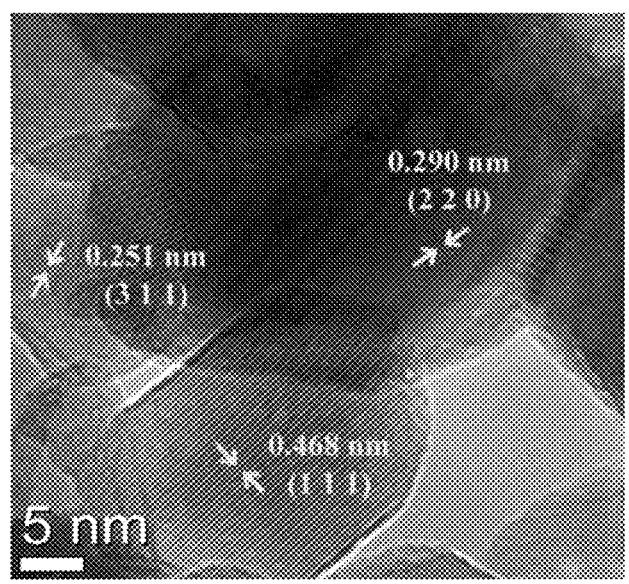

FIGS. 2A to 2C show images illustrating the analysis results of transmission electron microscopy (TEM) of $Co_{2.4}Sn_{0.6}O_4$ according to Example 1. [FIG. 2A: scale bar: 1 μm, FIG. 2B: scale bar: 100 nm and FIG. 2C: scale bar: 5 nm].

Referring to FIGS. 2A to 2C, it can be seen that $Co_{2.4}Sn_{0.6}O_4$ is a 1-dimensional rod-type one having a length of several micrometers and a thickness of several nanometers.

Figure 3A:
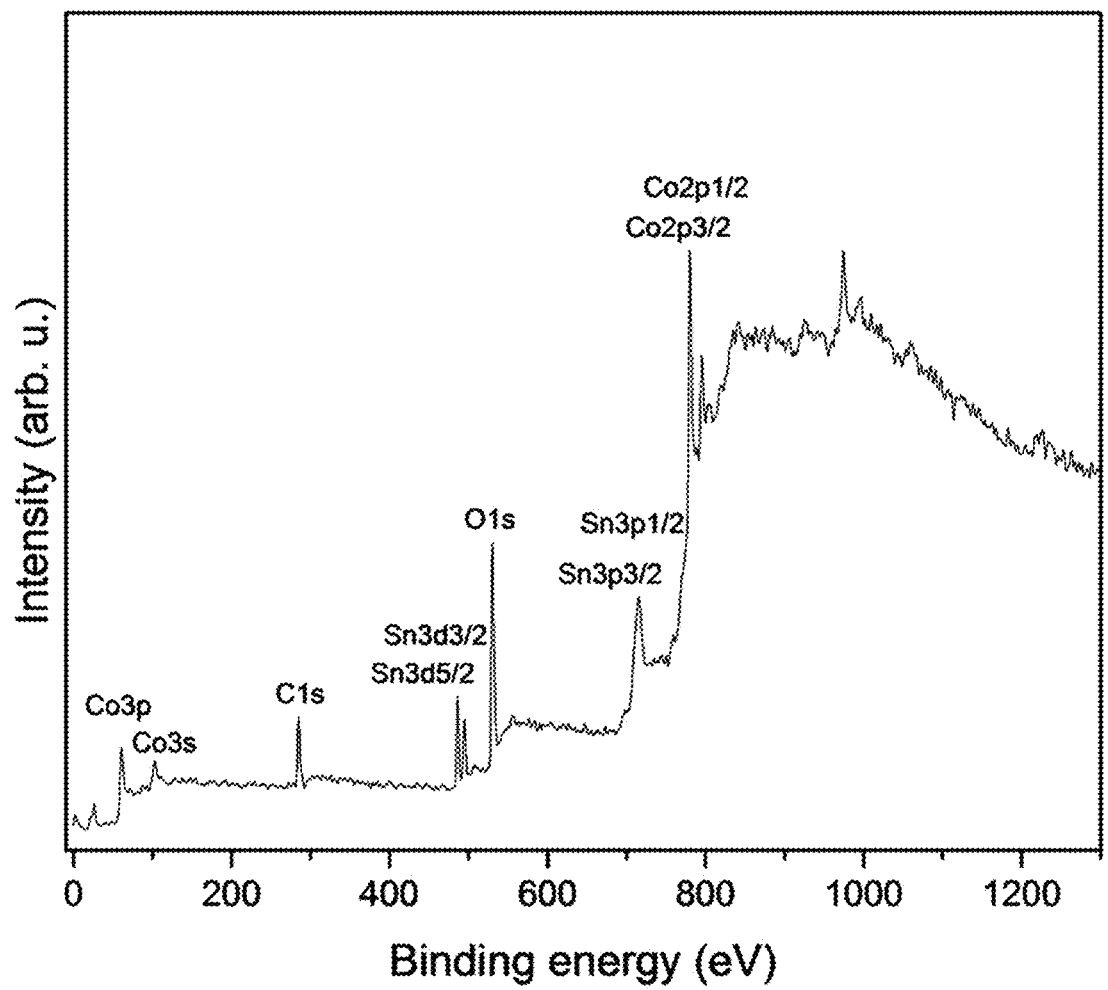
FIGS. 3A to 3D are graphs illustrating the analysis results of X-ray photoelectron spectrometry (XPS) of $Co_{2.4}Sn_{0.6}O_4$ according to Example 1.
Figure 3B:
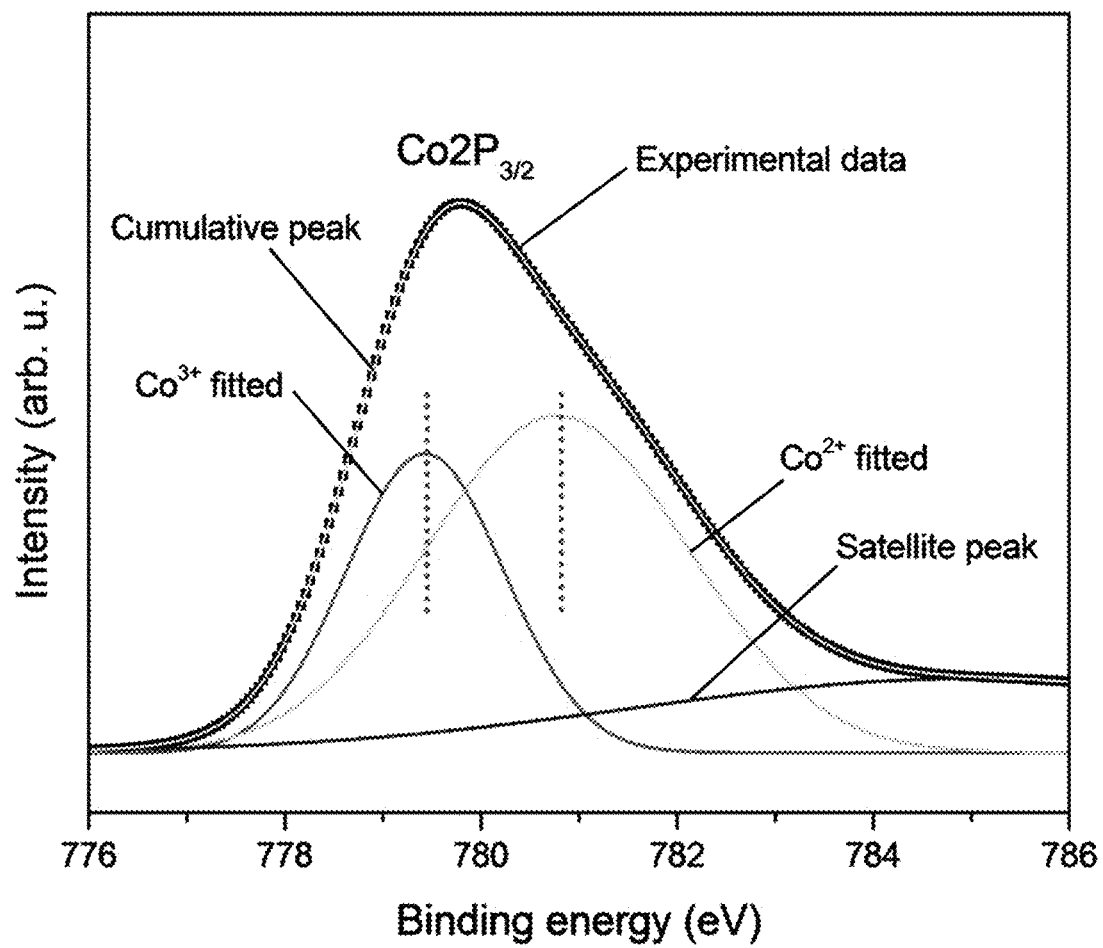
Figure 3C:
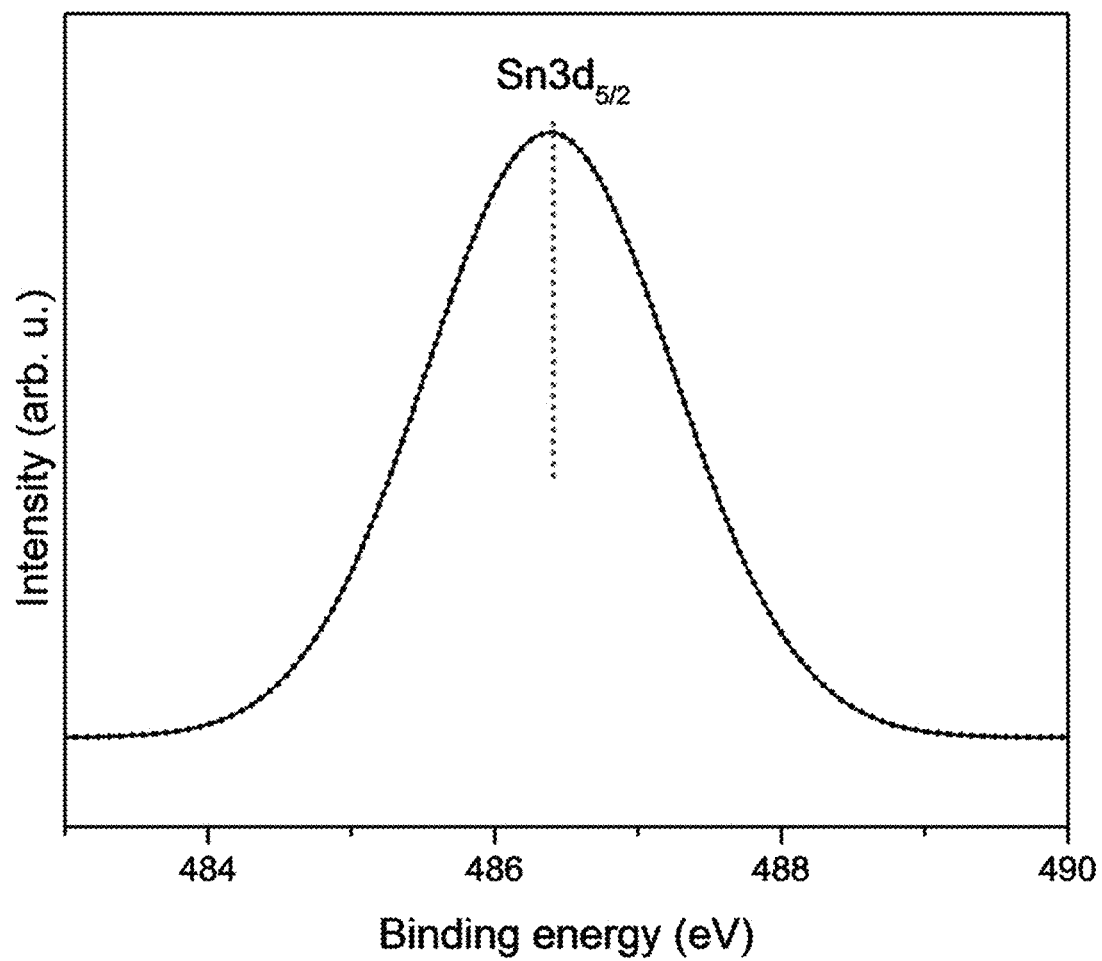
Figure 3D:
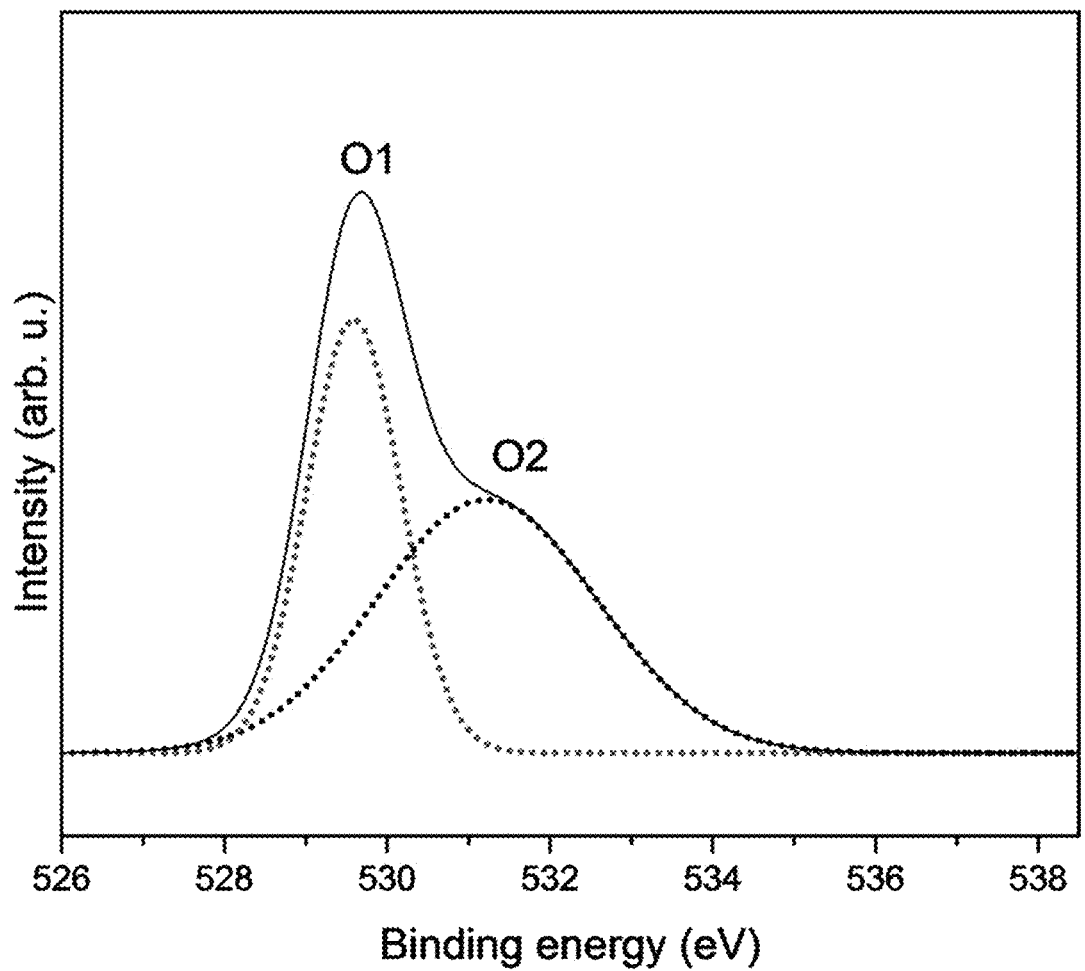

FIGS. 3A to 3D are graphs illustrating the analysis results of X-ray photoelectron spectroscopy (XPS) of $Co_{2.4}Sn_{0.6}O_4$ according to Example 1. [FIG. 3A: XPS graph in a range of 0 to 1300 eV, FIG. 3B: Co 2p, FIG. 3C: Sn 3d, and FIG. 3D O 1s].

Referring to FIGS. 3A to 3D, it can be seen that after analyzing $Co_{2.4}Sn_{0.6}O_4$, Co has an oxidation number of 2+ and 3+ suggesting a spinel structure, and Sn has an oxidation number of 4+.

Figure 4A:
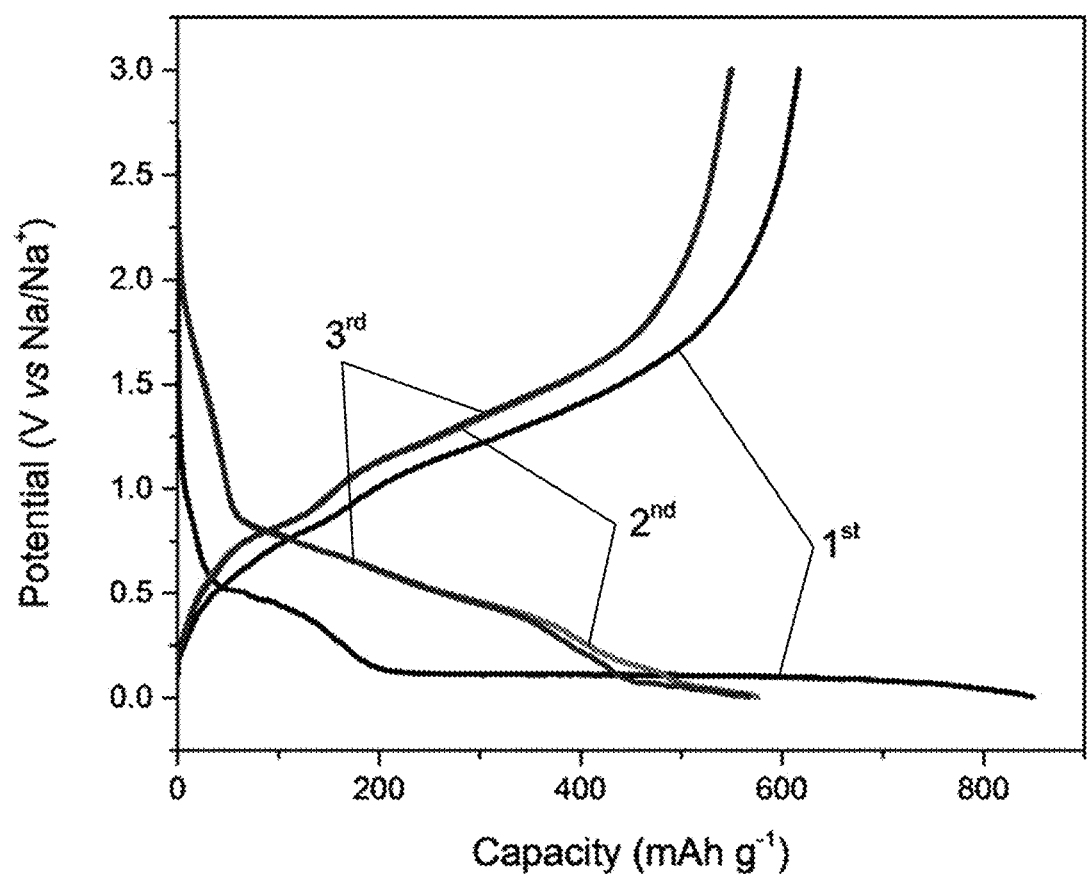
FIG. 4A shows graphs illustrating the results of the first, second and the third charge/discharge quality test at a C-rate of 0.05.
Figure 4B:
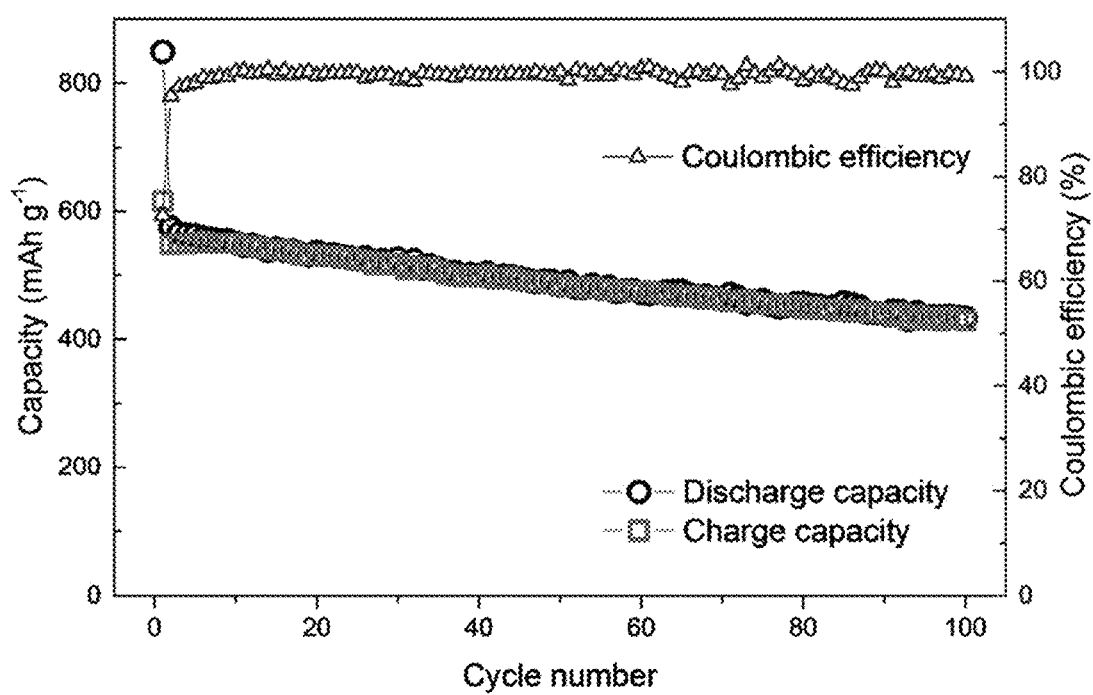
FIG. 4B shows the results of 100 times of cycle tests.
Figure 4C:
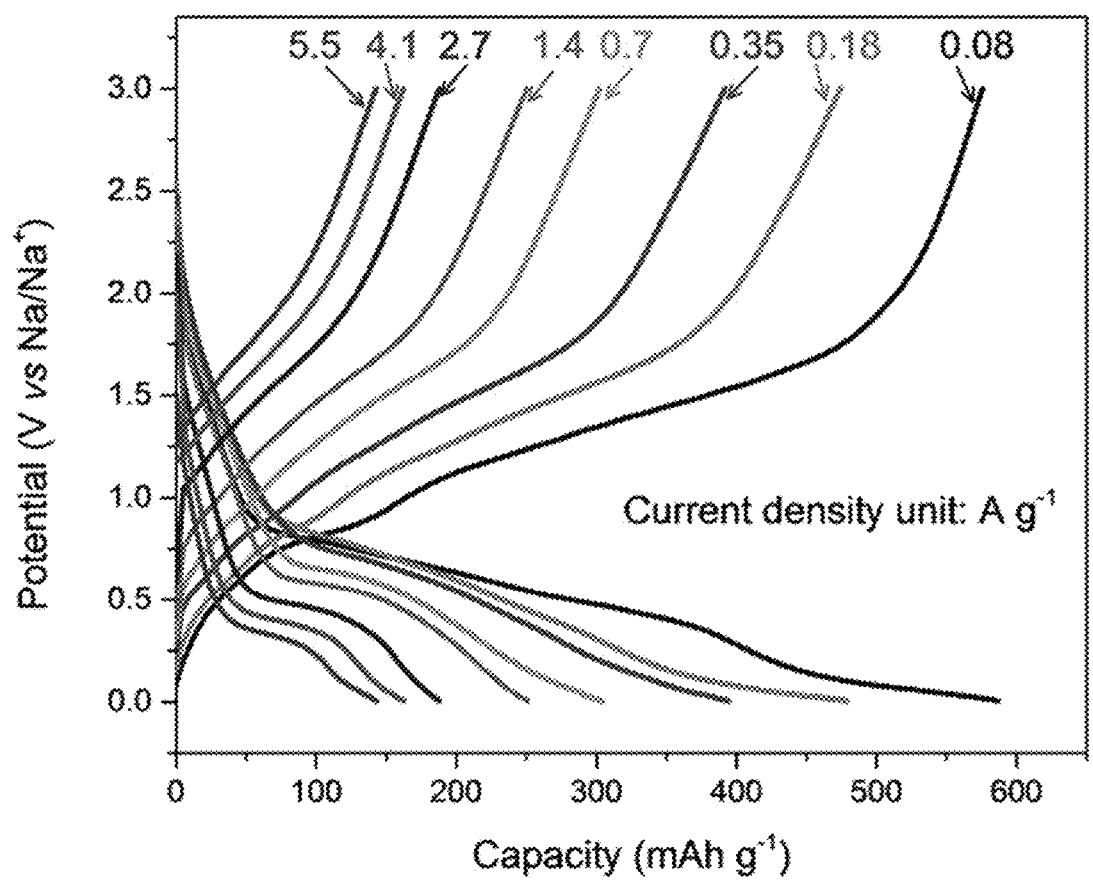
FIG. 4C shows the results of a charge/discharge cycle test at a C-rate of 0.08, 0.18, 0.35, 0.7, 1.4, 2.7, 4.1 and 5.5.
Figure 4D:
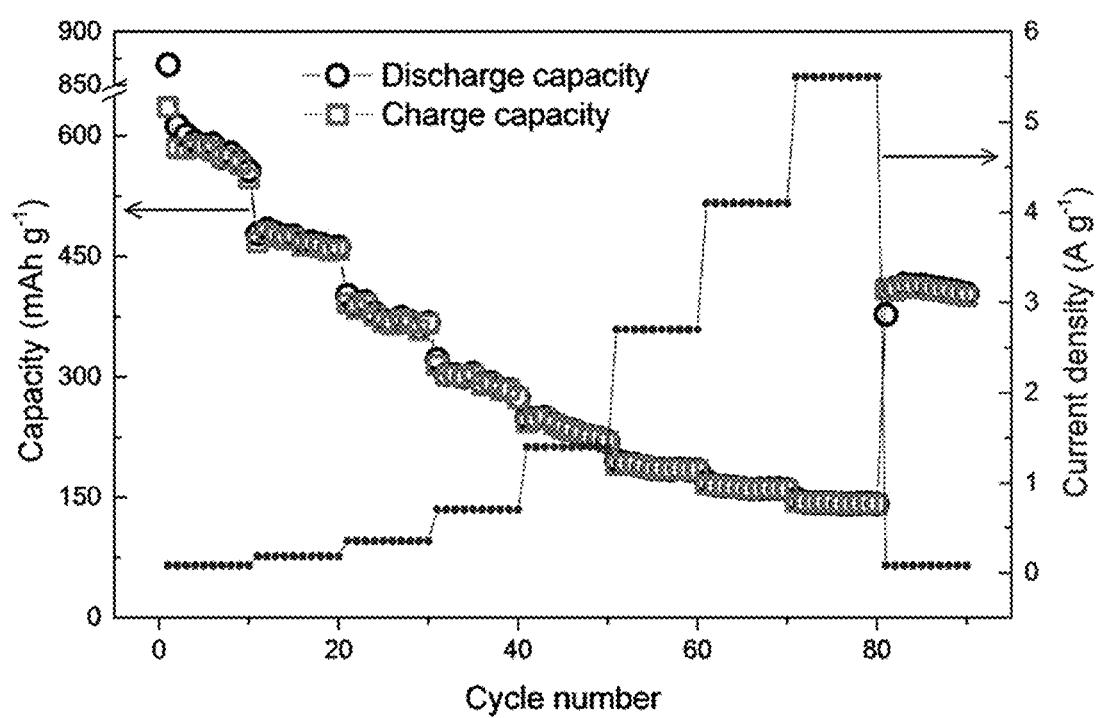
FIG. 4D shows the test results of high-rate characteristics of $Co_{2.4}Sn_{0.6}O_4$ according to Example 1.

FIG. 4A shows graphs illustrating the results of the first, second and the third charge/discharge quality test at a C-rate of 0.05, FIG. 4B shows the results of 100 times of cycle tests, FIG. 4C shows the results of a charge/discharge cycle test at a C-rate of 0.08, 0.18, 0.35, 0.7, 1.4, 2.7, 4.1 and 5.5, and FIG. 4D shows the test results of high-rate characteristics of $Co_{2.4}Sn_{0.6}O_4$ according to Example 1.

Referring to FIGS. 4A to 4D, it can be seen that a discharge capacity of 849 mAh $g^{-1}$ and a charge capacity of 617 mAh $g^{-1}$ are observed at the first cycle in a voltage range of 0.005-3.0 V and a current density of 80 mAg$^{-1}$. In addition, at the second cycle, the discharge capacity is 576 mAh $g^{-1}$ and a high coulombic efficiency of 95% or more is observed. Further, at the 100$^{th}$ cycle, the discharge capacity is 430 mAh g$^{-1}$ and a high coulombic efficiency of 99% or more is observed.

In addition, a coulombic efficiency of 73% is recorded at the first cycle due to the irreversible electrolyte decomposition (and formation of a solid electrolyte interface (SEI) layer) on the surface of the electrode material. Further, it can be seen that a clear plateau appears, while Na$^+$ ion is intercalated into the electrode at ~0.35 V during the first cycle, and a long sloping curve appears at ~0.1 V due to the formation of sodium oxide and metal nanoparticles.

Additionally, excellent high-rate characteristics are observed, as can be seen from a discharge capacity of 576, 475, 392, 302, 250, 188, 164 and 143 mAhg$^{-1}$, respectively, in a voltage range of 0.1-3.0 V at a current density of 0.08, 0.18, 0.35, 0.7, 1.4, 2.7, 4.1 and 5.5 A g$^{-1}$.

Figure 5A:
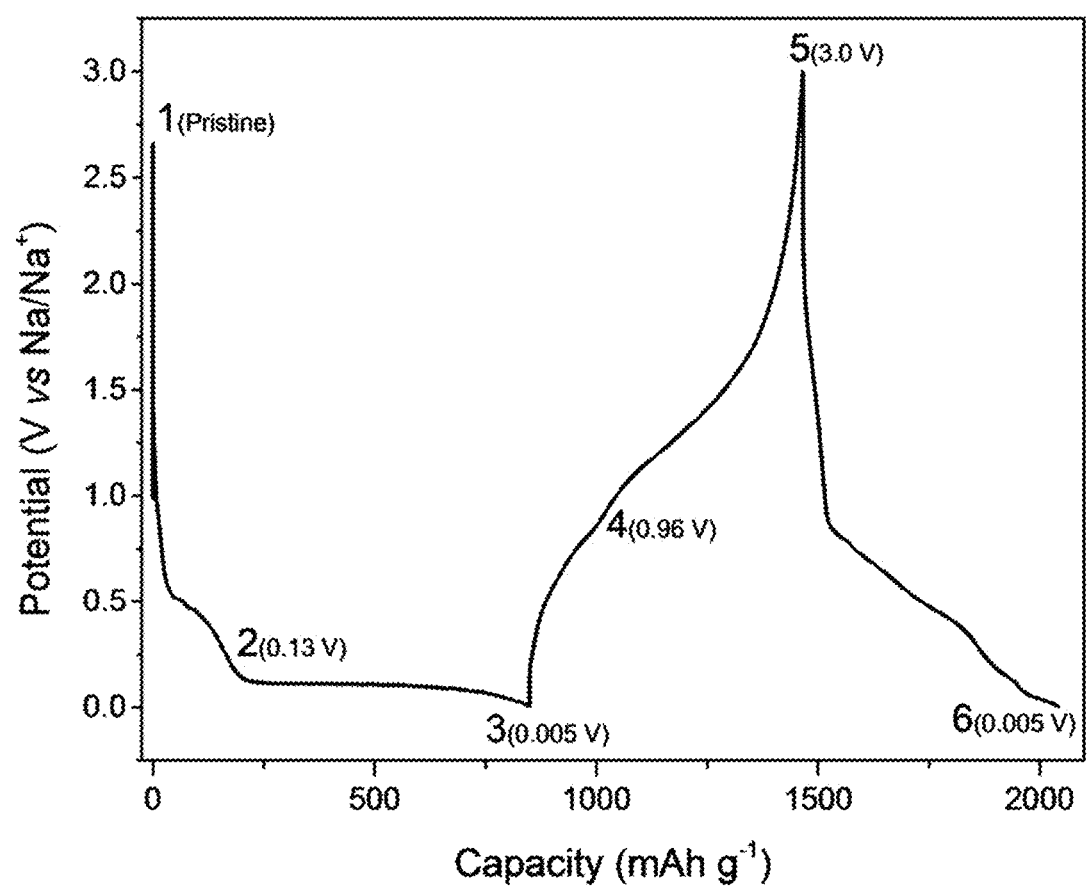
Figure 5B:
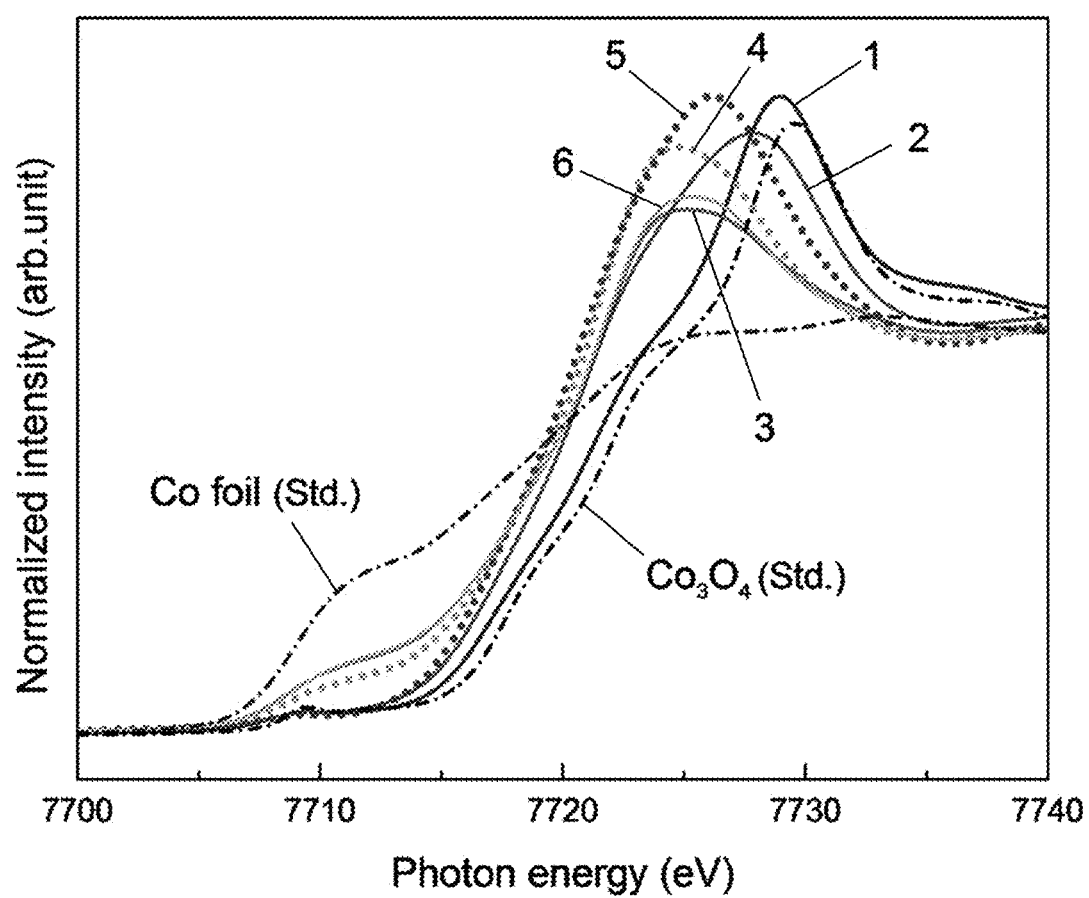
Figure 5C:
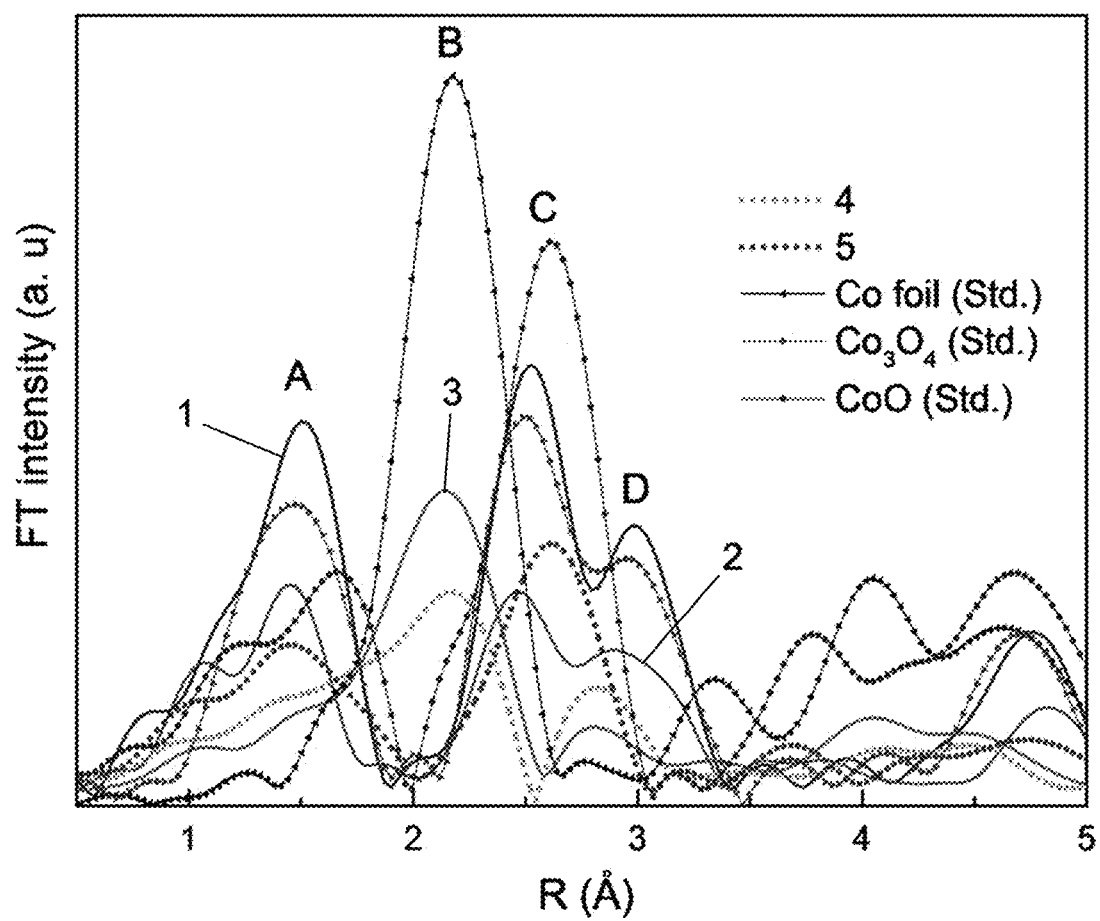
Figure 5D:
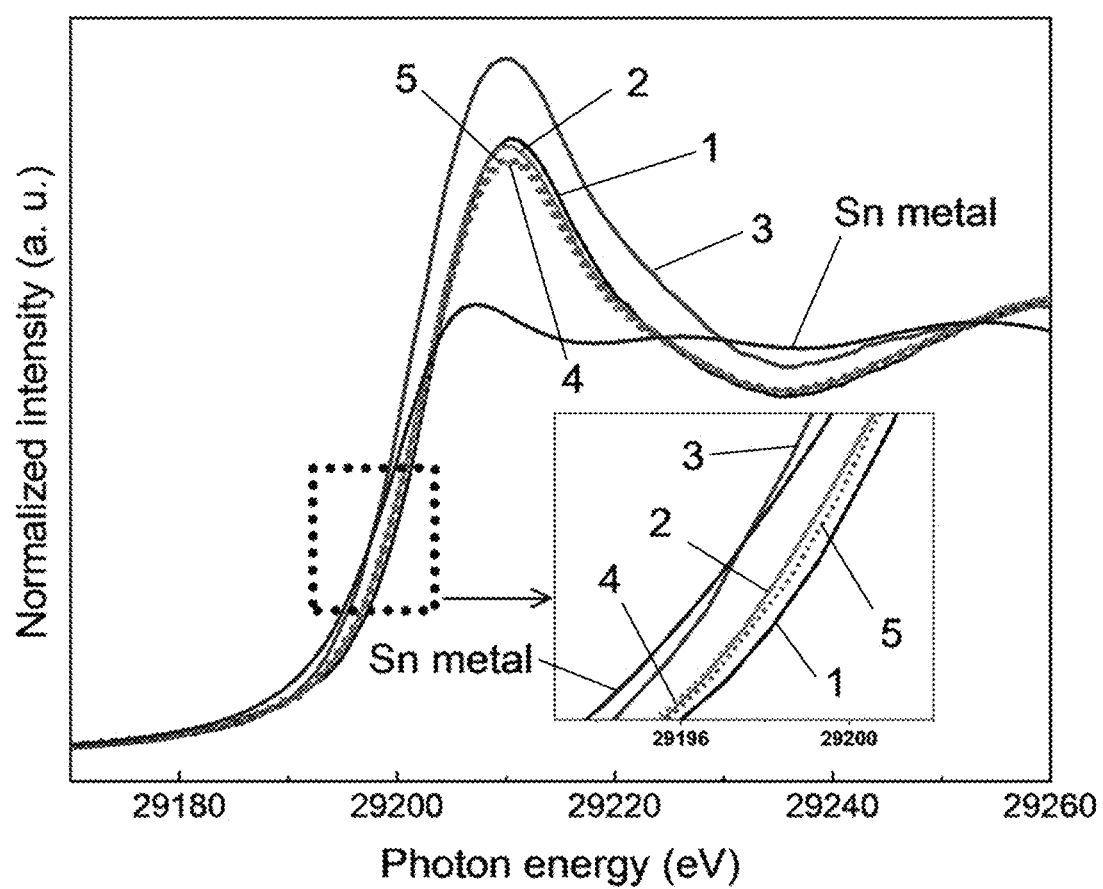

FIGS. 5A to 5D show the results of X-ray absorption spectrometry (XAS) of $Co_{2.4}Sn_{0.6}O_4$ according to Example 1, wherein FIG. 5A is a graph illustrating the samples for XAS analysis in charge/discharge behaviors, FIG. 5B illustrates the X-ray absorption near edge structure (XANES) analysis results of the anode including $Co_{2.4}Sn_{0.6}O_4$ at Co K-edge, FIG. 5C illustrates the extended X-ray absorption fine structure (EXAFS) analysis results of the anode including $Co_{2.4}Sn_{0.6}O_4$ at Co K-edge, and FIG. 5D illustrates the XANES results of the anode including $Co_{2.4}Sn_{0.6}O_4$ at Sn K-edge.

In FIG. 5B, it can be seen that from a change in Co K-edge XANES spectra that the energy value is varied reversibly during charge/discharge cycles. Such EXAFS spectrometric results show that CoO and $Co_3O_4$ form a solid solution in a fully charged state. In addition, in FIG. 5D, it can be seen from the Sn K-edge XANEX spectra showing a variable change in energy during charge/discharge cycles that such capacity characteristics result from the redox reaction between two metals.

Figure 6A:
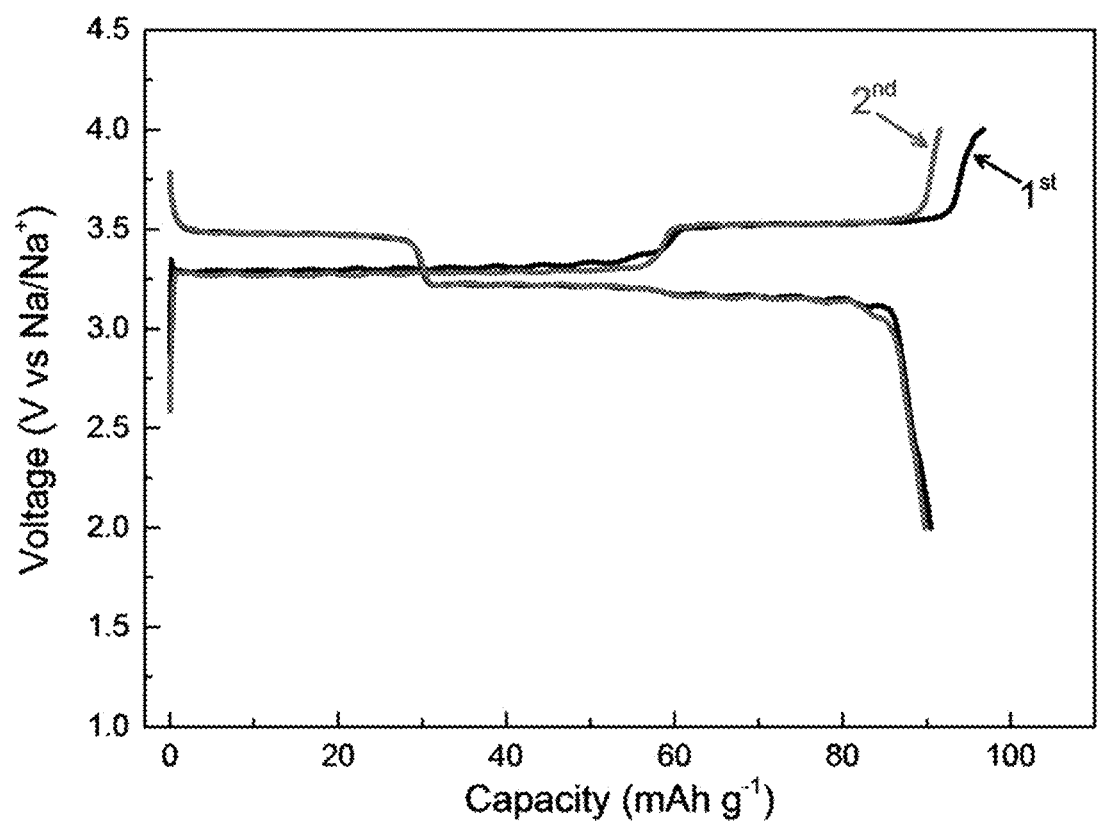
FIG. 6A shows graphs illustrating the results of a charge/discharge cycle test during the initial two cycles at 0.05 C (1 C=110 mAg$^{-1}$)
Figure 6B:
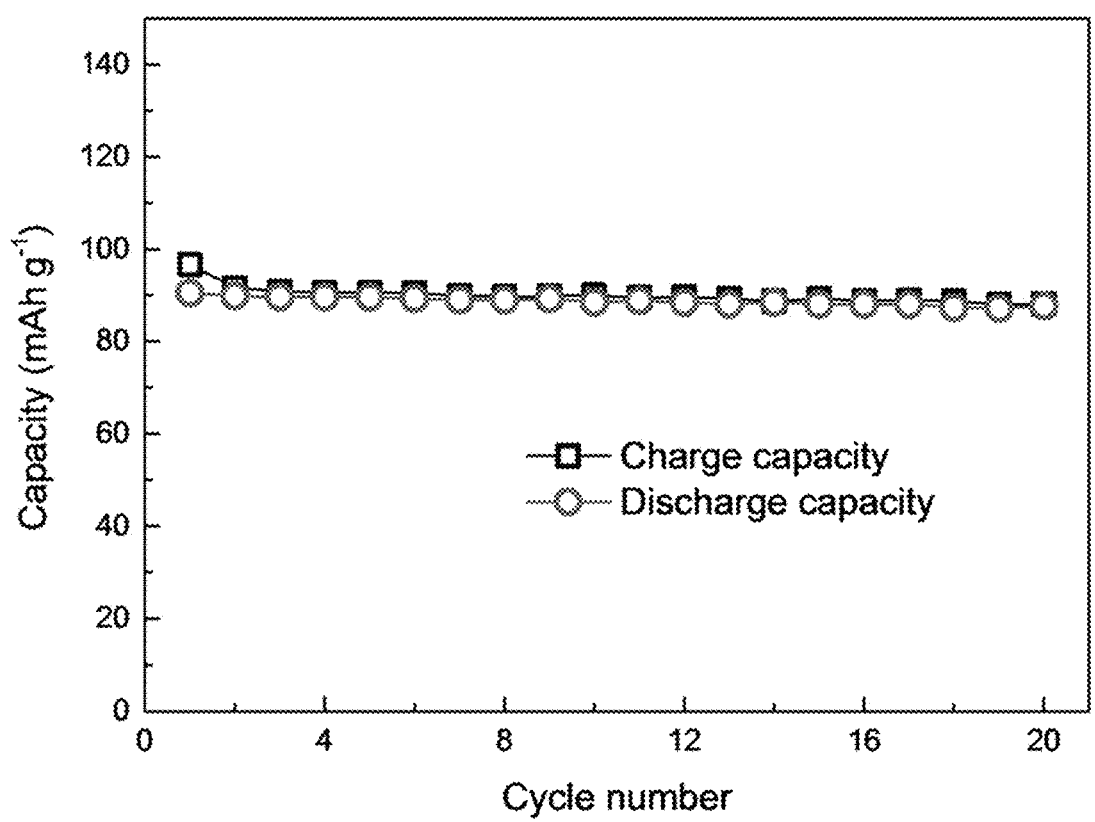
FIG. 6B shows the results of a cycle test in a range of 2.0-4.0 V at 0.05 C (1 C=110 mAg$^{-1}$) of the $NaNi_{2/3}Bi_{1/3}O_2$ half-cell electrode according to Example 3, and graphs illustrating in FIG. 6C show the results of a charge/discharge test at 0.05 C
Figure 6C:
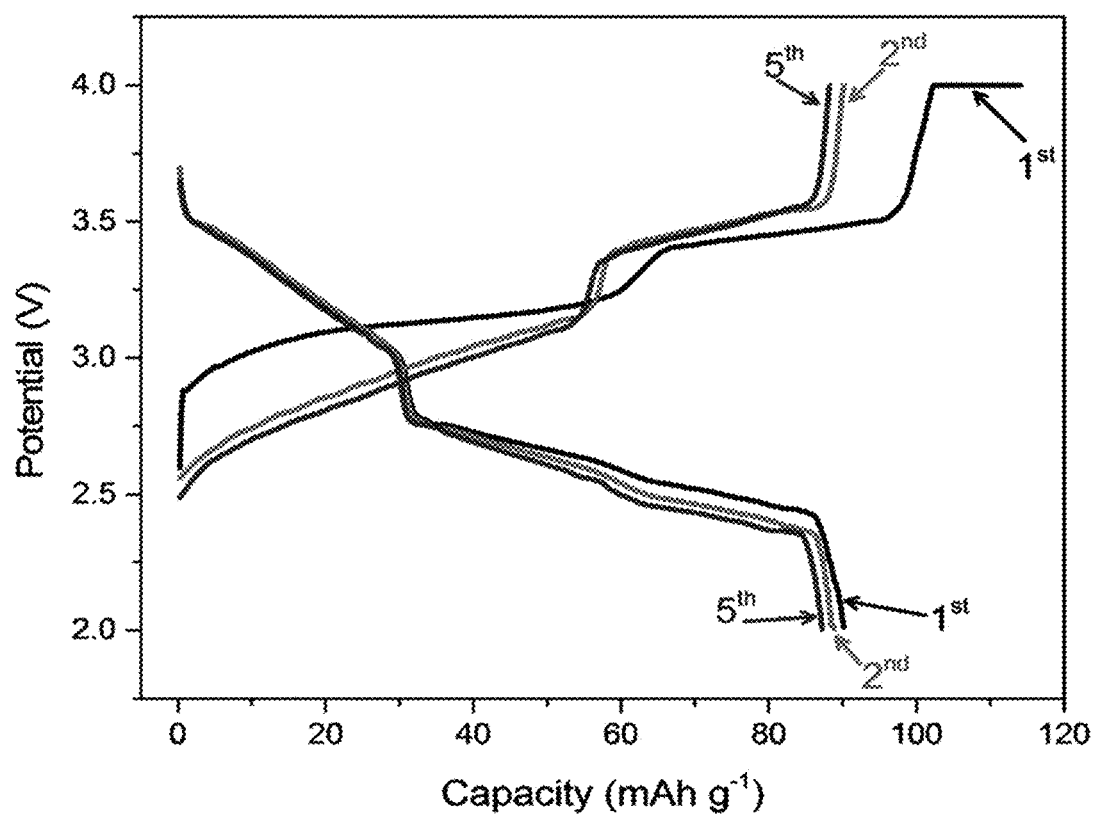
FIG. 6D shows the results of a cycle test in a range of 2.0-4.0 V at 0.05 C (1 C=110 mAg$^{-1}$) of a full cell including a $NaNi_{2/3}Bi_{1/3}O_2$ cathode and a $Co_{2.4}Sn_{0.6}O_4$ anode.
Figure 6D:
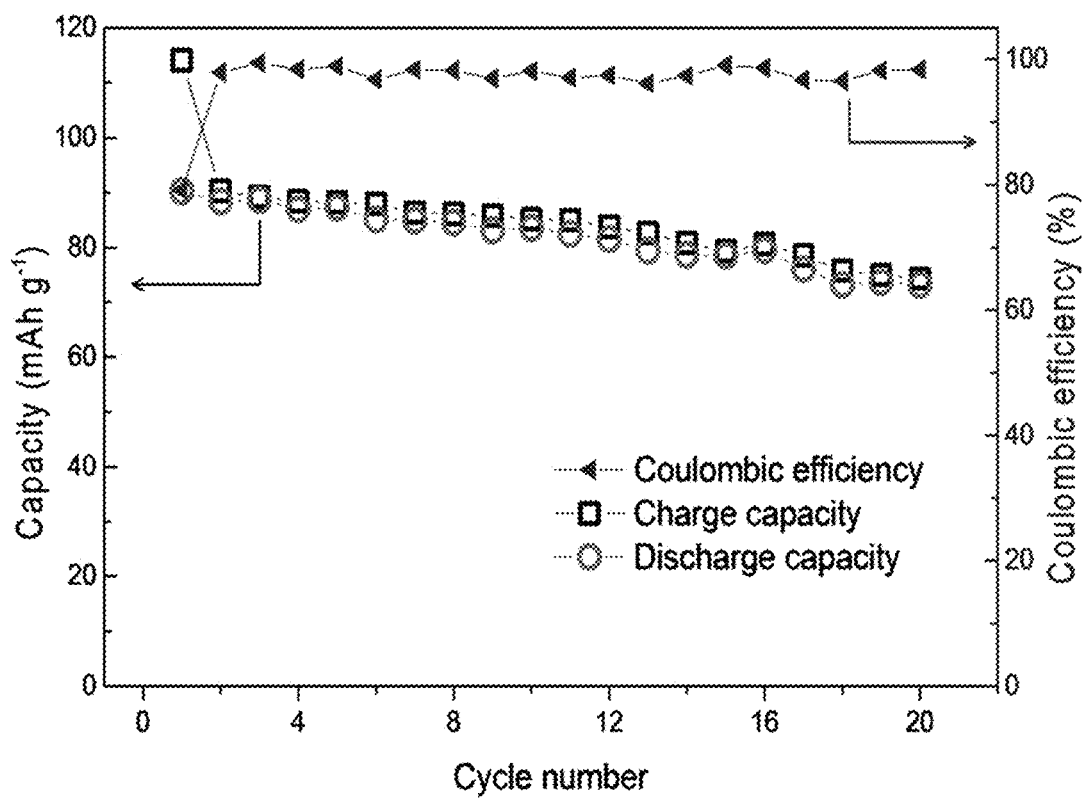

FIG. 6A shows graphs illustrating the results of a charge/discharge cycle test during the initial two cycles at 0.05 C (1 C=110 mAg$^{-1}$) and FIG. 6B shows the results of a cycle test in a range of 2.0-4.0 V at 0.05 C (1 C=110 mAg$^{-1}$) of the $NaNi_{2/3}Bi_{1/3}O_2$ half-cell electrode according to Example 3, and graphs illustrating in FIG. 6C show the results of a charge/discharge test at 0.05 C and FIG. 6D shows the results of a cycle test in a range of 2.0-4.0 V at 0.05 C (1 C=110 mAg$^{-1}$) of a full cell including a $NaNi_{2/3}Bi_{1/3}O_2$ cathode and a $Co_{2.4}Sn_{0.6}O_4$ anode.

Referring to FIGS. 6A to 6D, in the case of a $NaNi_{2/3}Bi_{1/3}O_2$ cathode half-cell, it shows an initial reversible capacity of 90 mAhg$^{-1}$ at a high voltage of 3.3 V. In addition, it can be seen from a capacity of 88 mAhg$^{-1}$ after 20 cycles that the coulombic efficiency is substantially 100%. Therefore, it can be seen from FIGS. 6C and 6D that the full cell including a $NaNi_{2/3}Bi_{1/3}O_2$ cathode and a $Co_{2.4}Sn_{0.6}O_4$ anode shows a change in initial reversible capacity from 90 mAhg$^{-1}$ to 73 mAhg$^{-1}$ during 20 cycles, and thus has excellent cycle characteristics.

As a result, according to the present disclosure, it is possible to obtain an anode active material for a sodium ion secondary battery including a cobalt tin spinel oxide obtained by a simple precipitation process. It is also possible to apply the anode active material to a sodium ion secondary battery having high capacity characteristics.

What is claimed is:

1. An anode active material for a sodium ion secondary battery, comprising:
   a cobalt tin spinel oxide represented by $Co_{2.4}Sn_{0.6}O_4$.

2. The anode active material for a sodium ion secondary battery according to claim 1, wherein the cobalt tin spinel oxide belongs to space group Fd-3m, has a lattice constant (a) ranging from 8.08985-8.089951, and has a space group volume ranging from 529.450-529.460 Å$^3$.

3. The anode active material for a sodium ion secondary battery according to claim 1, wherein the cobalt tin spinel oxide comprises nanoparticles having a particle size ranging from 5 nm to 100 nm and having an agglomerated rod shape that has a length ranging from 1 μm to 10 μm and a thickness ranging from 50 nm to 200 nm.

4. The anode active material for a sodium ion secondary battery according to claim 1, wherein after carrying out X-ray photoelectron spectrometry (XPS) analysis of the cobalt tin spinel oxide, a first XPS effective peak, a second XPS effective peak, a third XPS effective peak, a fourth XPS effective peak and a fifth XPS effective peak appear at a binding energy range of 777-781 eV, 778-784 eV, 484-489 eV, 528-531 eV, and 528-535 eV, respectively.

5. The anode active material for a sodium ion secondary battery according to claim 1, wherein the cobalt tin spinel oxide belongs to the space group Fd-3m, has a lattice constant, a, ranging from 8.08985-8.08995, has a space group volume of 529.450-529.460 Å$^3$, comprises nanoparticles having a size ranging from 5 nm to 100 nm and an agglomerated rod shape that has a length ranging from 1 μm to 10 μm and a thickness ranging from 50 nm to 200 nm, and
   wherein, after carrying out XPS analysis of the cobalt tin spinel oxide, the cobalt tin spinel oxide shows a first XPS effective peak, a second XPS effective peak, a third XPS effective peak, a fourth XPS effective peak and a fifth XPS effective peak appear at a binding energy range of 777-781 eV, 778-784 eV, 484-489 eV, 528-531 eV, and 528-535 eV, respectively.

6. A sodium ion secondary battery, comprising:
   an anode that comprises an anode active material comprising a cobalt tin spinel oxide represented by Chemical Formula 1 below:

$$Co_{2+x}Sn_{1-x}O_4,\qquad\text{Chemical Formula 1}$$

where x is a real number satisfying 0≤x≤0.9;
   an electrolyte; and
   a cathode.

7. The sodium ion secondary battery according to claim 6, wherein the cathode comprises $Na_3Ni_2BiO_6$.

8. An electric device comprising the sodium ion secondary battery as defined in claim 6, wherein the electric device is selected from the group consisting of an electric vehicle, a hybrid electric vehicle, a plug-in hybrid electric vehicle, and an electric power storage system.

* * * * *